No. 725,099. PATENTED APR. 14, 1903.
R. K. LE BLOND & W. F. GROENE.
VARIABLE SPEED MECHANISM FOR BACK GEARING.
APPLICATION FILED OCT. 4, 1902.
NO MODEL. 2 SHEETS—SHEET 1.
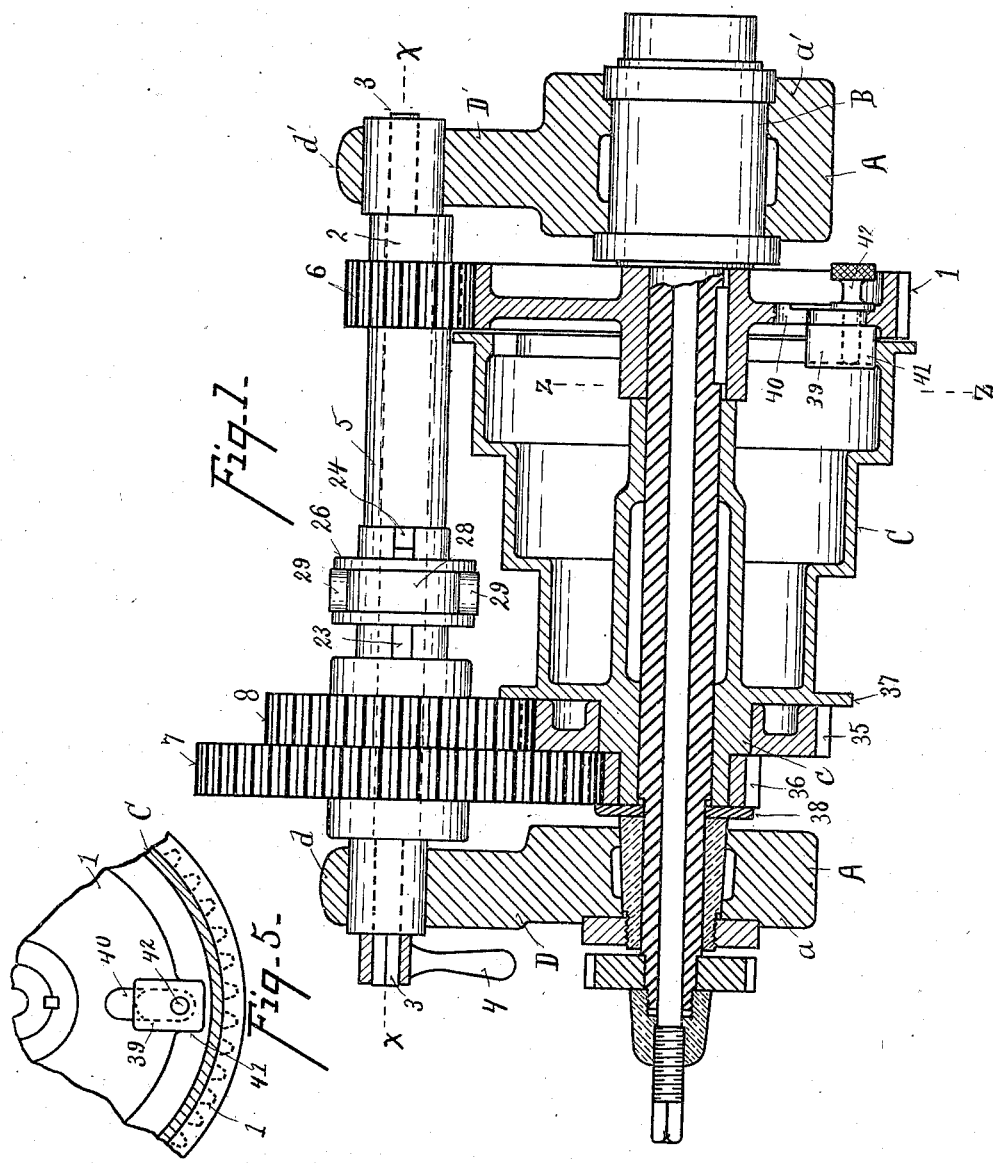
Witnesses.
Q. Harveycutter
Archibald Young
Inventors.
Richard K. LeBlond,
William F. Groene,
by Rob't P. Hains
Atty

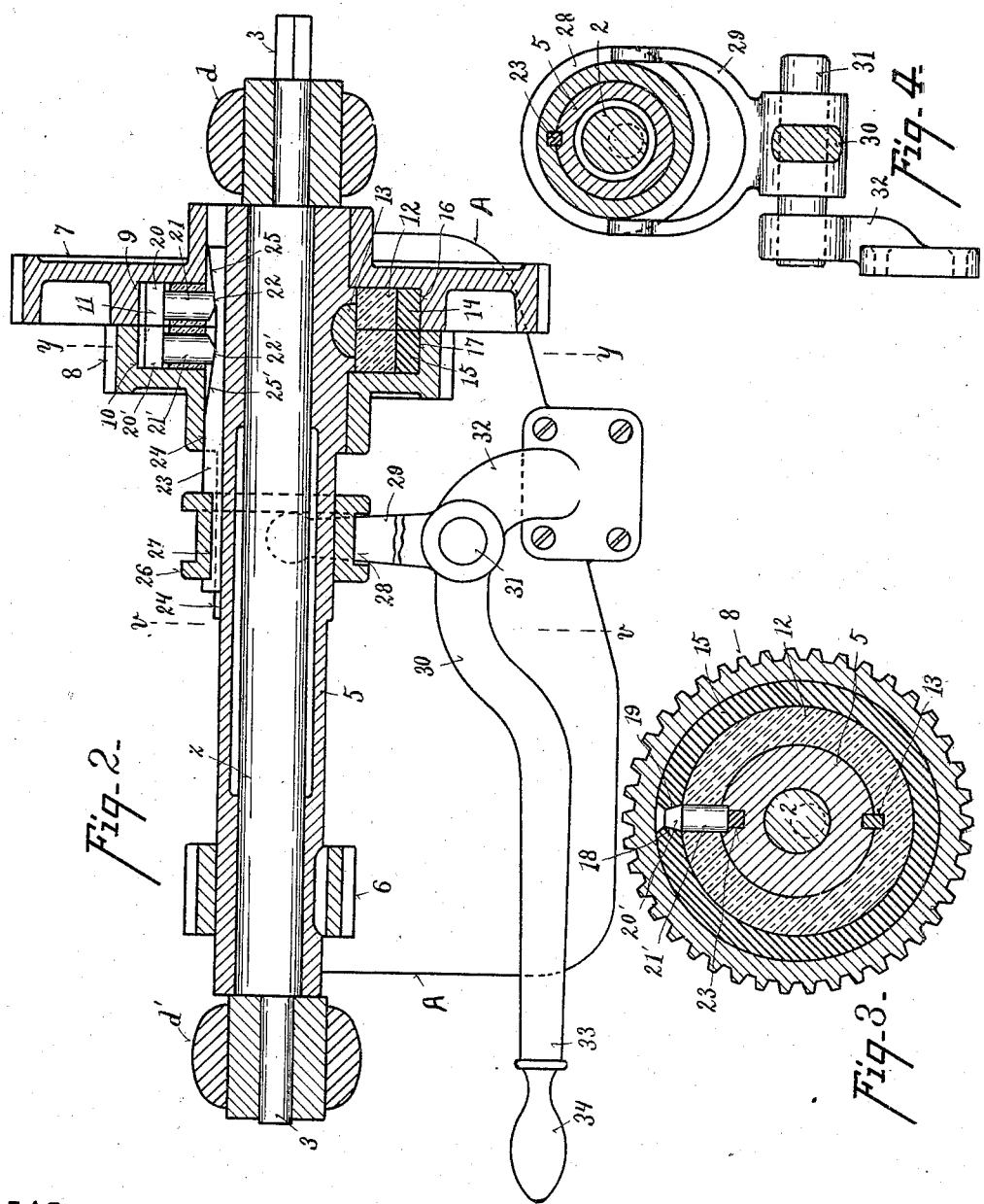

UNITED STATES PATENT OFFICE.

RICHARD K. LE BLOND AND WILLIAM F. GROENE, OF CINCINNATI, OHIO, ASSIGNORS TO THE R. K. LE BLOND MACHINE TOOL COMPANY, OF CINCINNATI, OHIO, A CORPORATION OF OHIO.

VARIABLE-SPEED MECHANISM FOR BACK-GEARING.

SPECIFICATION forming part of Letters Patent No. 725,099, dated April 14, 1903.

Application filed October 4, 1902. Serial No. 125,868. (No model.)

*To all whom it may concern:*

Be it known that we, RICHARD K. LE BLOND and WILLIAM F. GROENE, citizens of the United States, residing at Cincinnati, in the county of Hamilton and State of Ohio, have jointly invented certain new and useful Improvements in Variable-Speed Mechanism for Back-Gearing; and we do hereby declare the following to be a full, clear, and exact description of the same, reference being had to the accompanying drawings, forming a part of this specification.

The invention hereinafter described relates to variable-speed mechanism for back-gearing adapted for engine-lathes, milling-machines, and other machines for working upon metal. For convenience we have shown our improvement in connection with so much of a milling-machine as is advisable to show the connection of parts. In machines of this character the motive power is derived from a cone-pulley mounted about the spindle or quill.

It is the object of our invention to provide variable-speed mechanism for the back-gearing for regulating the speed of the spindle or quill. We accomplish this object by means mounted about the back-gearing shaft, thereby affording a very economical, compact, and simple construction.

The improvement will be readily understood from the following description, taken in connection with the accompanying drawings, in which—
Figure 1 is a plan view of our improved device, partly in section, shown in connection with so much of a milling-machine as is advisable to illustrate our invention. Fig. 2 is a central longitudinal vertical section of our improved device, taken on the line $x\ x$ of Fig. 1, with part of the milling-machine frame indicated in outline. Fig. 3 is a cross-section of our improved device, taken on the line $y\ y$ of Fig. 2. Fig. 4 is a cross-section on the line $v\ v$ of Fig. 2, showing the shifting means of our improved device with its connection to the milling-machine frame; and Fig. 5 is a detail showing the connecting means between the cone-pulley and spindle-gearing.

A represents the frame of a milling-machine, which in bearings $a\ a'$ supports the usual cone-pulley shaft B. The usual cone-pulley C is in this instance loosely mounted on the shaft. A gear 1 is rigidly secured or keyed to the shaft or quill. This cone-pulley shaft carries the cutter of the milling-machine in the usual way. The cone-pulley C and gear 1 are adapted to be interconnected by means hereinafter described for the purpose of communicating the power from the cone-pulley directly to the cutter-spindle or indirectly to that spindle through the back-gearing in manner hereinafter described.

Brackets D D' extend from the frame A and have bearings $d\ d'$ thereon. A shaft 2 is located between the brackets with the extensions 3 eccentric to the shaft supported in the bearings, so that said shaft may by this or any desired construction be moved toward and from the cone-pulley shaft or spindle. A lever 4 is attached to an extension for rocking the rock-shaft. A sleeve 5 rotates on the rock-shaft and has a gear 6 keyed to it. Gears 7 8 of different diameters are loosely mounted about the sleeve. These gears are recessed, respectively, between their bores and peripheries, forming annular depressions 9 and 10, the depressions combinedly forming a chamber 11 when the gears 7 8 are placed adjacent to each other on the sleeve. An outer sleeve 12 is secured to the inner sleeve, as by a key 13. Friction-bands 14 and 15 take about the outer sleeve in the chamber 11, the friction-band 14 being adapted to make frictional contact with friction-surface 16 of the recess of gear 7 and the friction-band 15 being adapted to make frictional engagement with the friction-surface 17 of the recess of the gear 8. The friction-bands are each provided with tapering contact-faces 18 19, (see Fig. 3,) against which the similar tapering contact-faces of plungers 20 20' are adapted to take for expanding the friction-bands into engagement with their respective friction-surfaces. The plungers reciprocate in seats 21 21' in the outer sleeve, the inner ends of the plungers being respectively tapered, as shown at 22 22'. A key 23 slides in a groove 24 in the inner sleeve longitudinally of the sleeve, the key having tapered contact-faces 25 25', tapered to coincide with the tapered faces at the inner end of the plungers and adapted to make contact with these latter faces alternately for selectively connecting either gear 7 or 8 with the sleeve by expanding either friction-ring. The tapered contact-faces 25 25' are so constructed as to form a depression between the faces, the apex of the inclines being preferably located outwardly from the vertical planes of the plungers. When the key is moved in one direction longitudinally of the sleeve, one of the plungers will be caused to recede from the friction-band, thereby releasing the gear of that friction-band, while the other plunger is forced outwardly by the key, causing the other friction-band to engage with the other gear. In this manner one or the other of gears 7 8 may be operatively connected with the inner sleeve, while the other is simultaneously left free of the sleeve to rotate thereon. If desired, both gears may be released from operative connection with the sleeve by bringing the key to such position that both plungers rest on the lower ends of the inclines of the key, as shown in Fig. 2, in which position the frictions are neutral. A yoke 26 is slidingly mounted on the inner sleeve for sliding the key, to which latter it is connected by resting in a notch 27. The yoke has an annular groove 28 to receive forks 29, mounted on a lever 30, pivoted on a stud 31, extending from bracket 32, suitably secured to the frame of the machine. The power end 33 of the lever may have a grip 34 attached to it, or it may be connected with a link or suitable moving device, and means may be also provided for holding the lever in any assumed position, either neutral or so that either of the frictions is in engagement in varying degrees. The stud 31 is elongated, so that the lever may slide sidewardly thereon, and the connection of the fork with the collar loose transversely of the inner sleeve, so that the sleeve may be rocked laterally without binding of parts.

The gear 8 meshes with a gear 35 and the gear 7 with a gear 36, the gears 35 and 36 being rigidly secured to an extension c of the cone-pulley C, so that motion may be imparted to the sleeve 5 by either gear 35 or 36 through the medium of gears 7 or 8, dependent on which of the latter is frictionally engaged with the sleeve. Motion of the sleeve to the spindle is imparted through the gears 6 and 1. The gear 35 has an outer flange 37, and the gear 36 has an outer flange 38, against which flanges the edges of the gears 7 and 8, respectively, engage for preventing axial movement of the gears 7 8.

In operation if it is desired to communicate motion direct from the cone-pulley to the spindle or quill of the machine the cone-pulley is directly connected with the spindle, as by means of a block 39, sliding in a way 40 on the gear 1 and taking into recess 41 in the inner flange of the cone-pulley, the block being clamped in place by means of a thumb-bolt 42. The engagement of the block with the walls of the recess causes the cone-pulley and gear to move together. If it is desired to vary the speed of the spindle beyond the range effected by the cone-pulley, the back-gearing mechanism mounted on the rock-shaft 2 is thrown into engagement with the gearing of the spindle and the block 39 is released from the recess 41.

Our improved device multiplies the spindle speeds by the speeds obtained through the back-gearing. It does this, further, by simple means which are compact in construction, out of the way of the back-gearing shaft, and easily manipulated. If it is desired, for instance, to vary the speed of the spindle or quill from that obtained by the cone-pulley, the back-gearing is thrown into mesh with the spindle-gears and a selective gear of the back-gearing operatively connected with its sleeve by shifting of the lever 30. If it is desired to further change the speed of the spindle, another selective gear of the back-gearing is thrown into operative relation with the sleeve of the back-gearing, the speed of the latter gear being then communicated to the spindle-gear. If it is desired, all the variable-speed-imparting gears may be thrown out of operative relation with the sleeve and the spindle operated directly by the cone-pulley, with the back-gearing still in mesh with the spindle-gears. When the rock-shaft 2 is rocked, it carries the entire back-gearing and speed-changing mechanism mounted thereon with it into or out of operative relation with the spindle-gears, the lever sliding laterally on stud 43 and the sleeve being also permitted to have a lateral movement with relation to the fork for preventing any binding of parts while retaining the parts in proper relation.

Having thus fully described our invention, what we claim as new, and desire to secure by Letters Patent, is—

1. In a variable-speed mechanism for back-gearing, the combination of the frame, the cone-pulley and its shaft and gears, an eccentrically-mounted shaft having a sleeve rotatable thereon, a plurality of gears of different diameters on said sleeve, means to rotate said shaft to throw the gears on the sleeve into and out of mesh with the gears on the cone-pulley shaft, each of said gears on the sleeve having a recess in the side thereof and the gears being arranged with the recesses in continuation of each other forming a chamber 11, a friction-band in each of said recesses and means within the chamber 11 for selectively connecting a friction-band with said gears.

2. In variable-speed mechanism, the combination, with the machine-frame, of the spindle, cone-pulley and plurality of gears having coincident axis, a shaft, means for moving said shaft toward and from the spindle, a sleeve rotatable about said shaft, a plurality of gears for the sleeve, recesses in the sides of said gears, friction-bands in the recesses, plungers for the friction-bands, with a key for the sleeve actuating the plungers and selectively causing the friction-bands to connect with the respective gears on the sleeve and thereby communicate motion from the cone-pulley to the spindle.

3. In variable-speed mechanism, the combination, with the machine-frame, of the spindle, cone-pulley and plurality of gears having coincident axis, a back-gear shaft, a plurality of gears for the back-gear shaft, recesses in the sides of said gears, friction-bands in the recesses, plungers for the friction-bands, with a key actuating the plungers and selectively causing the friction-bands to engage with the respective gears of the back-gear shaft and thereby communicate motion from the cone-pulley to the back-gear shaft.

4. In variable-speed mechanism for back-gearing, the combination, with the cone-pulley, cone-pulley shaft and pair of gears of different diameters rotating with the cone-pulley, a back-gear shaft, a pair of adjacent gears of different diameters loosely mounted about the back-gear shaft adapted to mesh with the first-named pair of gears, a channel between the adjacent gears, a sleeve in the channel, friction-bands taking about the sleeve, plungers in the sleeve expanding the friction-bands, and a double wedge-piece slidable longitudinally of the back-gear shaft and moving the plungers for engaging either friction-band with its gear, and thereby operatively connecting the cone-pulley and back-gear shaft.

5. In variable-speed mechanism for back-gearing, the combination, with the cone-pulley, cone-pulley shaft, and pair of gears of different diameters rotating with the cone-pulley, a shaft, a sleeve thereon, means to move the shaft toward and from the cone-pulley shaft, a pair of adjacent gears of different diameters loosely mounted about the sleeve adapted to mesh with the first-named pair of gears, a channel between the adjacent gears, an outer sleeve in the channel, friction-bands taking about the outer sleeve, plungers in the outer sleeve expanding the friction-bands, and a double wedge-piece slidable longitudinally of the sleeve and moving the plungers for engaging either friction-band with its gear, and thereby operatively connecting the cone-pulley and sleeve.

6. In variable-speed mechanism for back-gearing, the combination, with the cone-pulley, cone-pulley shaft and pair of gears of different diameters rotating with the cone-pulley, a shaft, a sleeve thereon, means to move the shaft toward and from the cone-pulley shaft, a pair of adjacent gears of different diameters loosely mounted about the sleeve adapted to mesh with the first-named pair of gears, a channel between the adjacent gears, an outer sleeve in the channel, friction-bands taking about the outer sleeve, plungers in the outer sleeve expanding the friction-bands, and a double wedge-piece slidable longitudinally of the sleeve and moving the plungers for engaging either friction-band with its gear, and thereby operatively connecting the cone-pulley and sleeve, and means for permitting the plunger to rest in neutral position with the friction-bands disengaged from the gears.

In testimony whereof we have signed our names hereto in the presence of two subscribing witnesses.

RICHARD K. LE BLOND.
WILLIAM F. GROENE.

Witnesses:
  MASON P. PRITCHARD,
  AUGUST F. HERBSLEB.